United States Patent [19]

Liu

[11] Patent Number: 4,617,666
[45] Date of Patent: Oct. 14, 1986

[54] FREQUENCY DOUBLING A LASER BEAM BY USING INTRACAVITY TYPE II PHASE MATCHING

[75] Inventor: Kuo-Ching Liu, Setauket, N.Y.

[73] Assignee: Quantronix Corporation, Smithtown, N.Y.

[21] Appl. No.: 792,477

[22] Filed: Oct. 29, 1985

Related U.S. Application Data

[63] Continuation-in-part of Ser. No. 724,089, Apr. 17, 1985.

[51] Int. Cl.⁴ ............................................. H01S 3/10
[52] U.S. Cl. ........................................ 372/22; 372/27; 372/21; 372/98; 372/10; 307/427
[58] Field of Search ..................... 372/22, 21, 10, 20, 372/98, 27; 307/427; 350/388, 392

[56] References Cited

U.S. PATENT DOCUMENTS

| | | | |
|---|---|---|---|
| 4,331,891 | 5/1982 | Ruzzo | 307/427 |
| 4,408,329 | 10/1983 | Ferguson | 372/10 |
| 4,413,342 | 11/1983 | Cohen et al. | 372/22 |
| 4,510,402 | 4/1985 | Summers et al. | 372/22 |

OTHER PUBLICATIONS

Dmetriev et al.; "Enhancement of the Efficiency of Second-Harmonic Generation Inside a Resonator"; Sov. Jour. Quant. Elect. 4(9), Mar. 1975.

*Primary Examiner*—Léon Scott, Jr.
*Attorney, Agent, or Firm*—Kane, Dalsimer, Kane, Sullivan and Kurucz

[57] ABSTRACT

A frequency doubler for a laser is disclosed in which a Type II SHG crystal is oriented to generate a second harmonic frequency beam in response to the orthogonal components of a fundamental beam. After the fundamental beam makes a round trip through the SHG crystal, any differential phase delays between the E and O rays of the fundamental beam due to birefringence are eliminated to improve the efficiency and stability of the cavity.

9 Claims, 2 Drawing Figures

FREQUENCY DOUBLING A LASER BEAM BY USING INTRACAVITY TYPE II PHASE MATCHING

RELATED APPLICATIONS

This is a continuation-in-part application to application Ser. No. 724,089, filed on Apr. 17, 1985 and entitled "FREQUENCY DOUBLING A LASER BEAM BY USING INTRACAVITY TYPE II PHASE MATCHING".

BACKGROUND OF THE INVENTION

1. Field of the Invention

The field of the invention concerns a frequency-doubled laser, and in particular a method and apparatus for generating a frequency doubled beam using Type II phase-matching in an intracavity second harmonic generation crystal.

2. Description of the Prior Art

Second Harmonic Generation (SHG) provides a means of doubling the frequency of a laser source. In this process, a fundamental electromagnetic wave in a nonlinear medium induces a polarization wave with a frequency that is double that of the fundamental wave. Because of dispersion in the refractive index of the medium, the phase velocity of such a wave is a function of its frequency, so the phase of the induced second harmonic polarization wave is retarded from that of the fundamental wave. Since the vector sum of all the generated second harmonic polarizations yields the SHG intensity, the intensity is limited by the phase retardation. A technique, known as phase matching, is designed to overcome this difficulty by utilizing in uniaxial and biaxial crystals the natural birefringence, i.e. the difference in the phase velocity as a function of polarization, to offset the dispersion effect so that the fundamental and second harmonic wave can propagate in phase.

There are two well known types of phase matching, which empoly the polarization vectors of the incident fundamental wave in different ways.

In Type I phase matching, the fundamental wave is polarized perpendicular to the crystal's optic axis (an O or ordinary ray) and the induced Second Harmonic wave is polarized parallel to the optical axis (an E or extraordinary ray). (A method utilizing Type I phase matching is described in U.S. Pat. No. 4,413,342.) Since the fundamental wave is polarized along the optic axes of the crystal, there is no change in its linear polarization when it exits from the crystal. An intracavity Type I SHG arrangement can easily be adopted to take advantage of the higher power density available within the laser cavity because the introduction of the SHG crystal will not produce a significant polarization loss.

In Type II phase matching, the linearly polarized fundamental wave is equally divided into O and E rays by requiring its polarization to be 45° with respect to the optic axis of the crystal; the output second harmonic wave which results is linearly polarized parallel to the optic axis (an E ray). Here, the phase velocities of the O and E rays of the incident fundamental wave are different due to the natural birefringence of the crystal. In general, the linear polarization of this input fundamental wave is turned into an elliptical polarization as it propagates through the crystal. The magnitude of the phase retardation between O and E rays is the product of the index dffference in the material and the effective optical path.

When such a Type II crystal is placed inside a laser resonator, this phase retardation can cause serious power loss when the laser is linearly polarized because the original linear polarization will not in general be properly maintained.

When the laser is randomly polarized, as is the case in multimode lasers when the laser active medium is not naturally birefringent and no polarizing elements are employed intracavity, the Type II SHG crystal provides a phase retardation between the polarization components resolved along its O and E axes. This retardation, which doubles on the return trip of the fundamental beam through the Type II SHG crystal can affect the stability and output power of the laser by affecting the laser's ability to optimize its polarization relative to thermal or other induced birefringent effects in the laser active medium. One can attempt to compensate this phase retardation using a passive device such as a Babinet-Soleil compensator. However, the retardation is usually dependent upon temperature and variations in temperature can be induced either by the ambient environment or by self-absorption of the laser radiation (fundamental and/or second harmonic) in the crystal itself. Such passive compensation thus becomes difficult to maintain during standard laser operation. Due to these problems, Type II SHG has typically been employed in an extracavity arrangement in which the polarization of the exiting fundamental wave from the SHG crystal is unimportant. Of course the advantage that the higher power density intracavity fundamental wave within the laser cavity has in generating second harmonic, is lost.

Many lasers can have the temporal form of their output power altered by a process known as Q-switching. Here, a special device which alters the optical quality or Q of the resonator is inserted into the beam within the resonator cavity. This "Q-switch" can be activated to produce enough optical loss to overcome the optical gain or amplification supplied by the laser active medium, thereby inhibiting oscillation. If the source exciting the laser active medium is maintained on during the low Q-period, energy is stored in the laser active medium in the form of an excess population inversion. When the Q-switch is turned off (returning the resonator quickly to its high Q state) this excess population is utilized to produce a high-intensity, Q-switched pulse. Since most Q-switches are electronically controlled, the process is repeatable at high repetition rates making a Q-switched laser a useful source of high intensity pulses. Peak pulse intensities many thousands of times the laser's continuous wave output power level can be generated. Because of the superior focusability and enhanced material interaction of shorter wavelengths, it is often of interest to frequency-double the output of Q-switched lasers.

OBJECTIVES AND SUMMARY OF THE INVENTION

It is a principal object of the invention to overcome the disadvantages of a system using intracavity Type II phase matching for SHG by having the effect of birefringence of the SHG crystal be compensated for upon return passage of the fundamental wave through the SHG crystal.

It is another object of the invention to provide laser frequency doubling apparatus with a laser medium in which the fundamental beam incident on the laser medium maintains its original linear or random polarization.

The system includes a laser harmonic generating means for generating the second harmonic frequency of the fundamental frequency emitted by the laser, means for dynamically compensating for any phase lags generated in the fundamental beam passing through said harmonic generating means, a first highly reflecting mirror at the fundamental frequency, and a second mirror. The first and second mirrors are positioned to form a cavity for the laser, the harmonic generator and the compensating means.

DETAILED DESCRIPTION OF THE DRAWINGS

Figure 1:
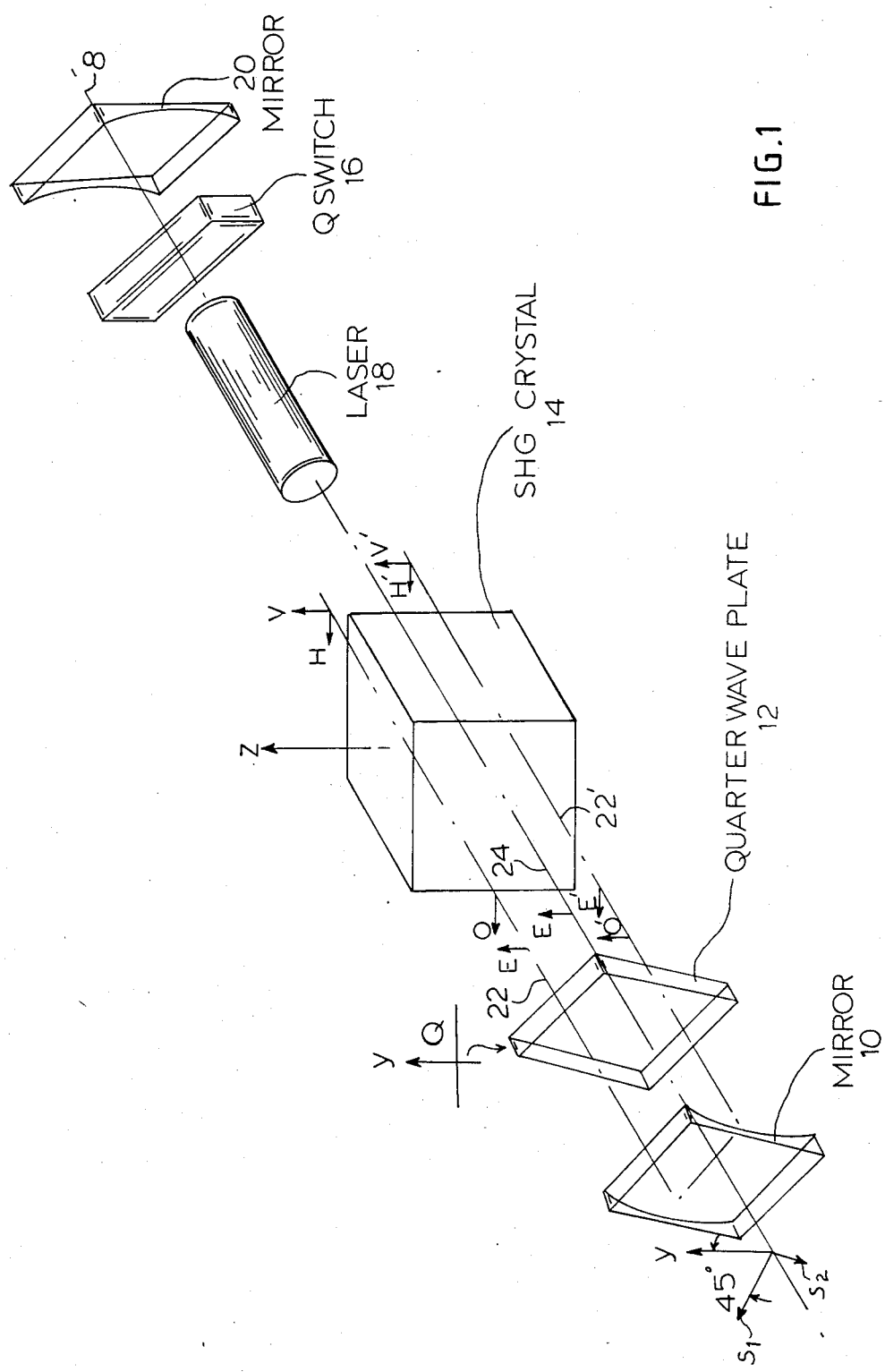
FIG. 1 illustrates a second harmonic laser generator according to this invention.

Referring now to FIG. 1, a frequency doubling laser system comprises the following elements aligned along a common optical axis 8 as shown: a mirror 10, a quarter wave plate 12, an SHG crystal 14, an active laser medium 18, an optional Q-switch 16, and a second mirror 20. Laser 18 is adapted to generate a laser beam at a predetermined fundamental frequency along common axis 8. For example the laser may be a YAG laser which emits a beam at a wavelength of 1064 nm. The active laser medium, a laser rod, may be included within a pumping reflector with a pumping lamp. These latter laser elements are well known in the art and therefore have not been shown in FIG. 1 for the sake of clarity.

The beam emitted by laser active medium 18 has a random polarization and is shown in FIG. 1 as being resolved into two orthogonal components V and H.

Crystal 14 is a known second harmonic generator crystal such as a KTP (potassium titanyl phosphate) crystal. Crystal 14 is oriented with its optic axis, shown by arrow Z in FIG. 1, parallel to one of the components of the beam from laser active medium 18, for example, component V. Thus, for example, component V from laser 18 is oriented vertically along the Y axis and component H horizontally along X. Then as shown in FIG. 1, the E and O axes of crystal 14 are oriented parallel and perpendicular to the vertical.

Plate 12 is selected to operate as a quarter wave plate at the fundamental frequency. The optical axis of the plate indicated by arrow Q in FIG. 1 is oriented at 45° to the V component of the fundamental beam.

Mirror 10 is highly reflective at the fundamental frequency and highly transmissive at the second harmonic frequency. Mirror 20 is highly reflective at the fundamental frequency. Mirrors 10 and 20 are positioned and arranged to form a resonating optical cavity for the fundamental beam generated by active laser medium 18, with the SHG crystal 14 and plate 12 disposed within the cavity.

As the initial beam 22 propagates through the crystal 14, the crystal, in response to both the V and H components (the O and E rays) of the linearly polarized beam 22, generates a beam 24 having double the frequency of the fundamental beam oriented along the vertical (an E ray) as shown. Beam 24 is transmitted through plate 12, and mirror 10 out of the cavity.

As the fundamental beam 22 with its vertical and horizontal polarizations oriented parallel and perpendicular to the Z axis, propagates through the SHG crystal, the birefringence causes a phase retardation to occur between fundamental V and H components (E and O rays respectively) of fundamental beam 22.

In FIG. 1 it is assumed that after passing through crystal 14, the O ray of the fundamental beam 22 lags behind the E ray.

Without any phase lag compensatory means, the fundamental beam reflected from mirror 10 and back through the SHG crystal will exhibit twice the phase retardation shown after one pass and the polarization of the beam reentering the laser active medium 18 will not in general be the same as that initially leaving 18 possibly resulting in significant and undesirable losses or instability in laser 18.

Therefore, in the present invention, beam 22 is passed from SHG crystal 14 through plate 12 which is a quarter-wave plate of the fundamental frequency. In FIG. 1, as previously mentioned, the plate 12 is shown with its optic axis at 45° to the component V of the fundamental beam incident on crystal 14. After reflection by mirror 10, the beam 22' passes again through quarter wave plate 12. As a result of the two passes through quarter wave plate 12, the V and H rays of beam 22 have been rotated by 90° so that, as shown in FIG. 1, the orientation of the E and O rays of beam 22' are reversed with respect to the orientation of the components of beam 22. However ray O still lags behind E. The reflected beam 22' then passes through crystal 14 but this second time, ray E is differentially phase shifted by amount identical to the first differential phase shift with respect to O so that the rays E and O of the beam 22' as it leaves the crystal 14 are now in phase and combine to yield fundamental beam components V and H in the same phase as originally left crystal 12. Therefore by interposing plate 12 between crystal 14 and mirror 10, the birefringent effects of the SHG crystal are successfully self-compensated and thereby eliminated.

As a result, the fundamental beam components V and H incident on crystal 14 and the fundamental beam components V' and H' exiting from the crystal 14 have identical phase relationships resulting in no loss or instability in the laser resonator.

It should be appreciated that plate 12 and crystal 14 accomplish their intended purposes dynamically. In the present invention, the phase lag is automatically and accurately corrected regardless of the temperature of the crystal.

If necessary, a Q-switch 16 may be added between laser 18 and mirror 20 to Q-switch the laser beam in the normal manner.

Figure 2:
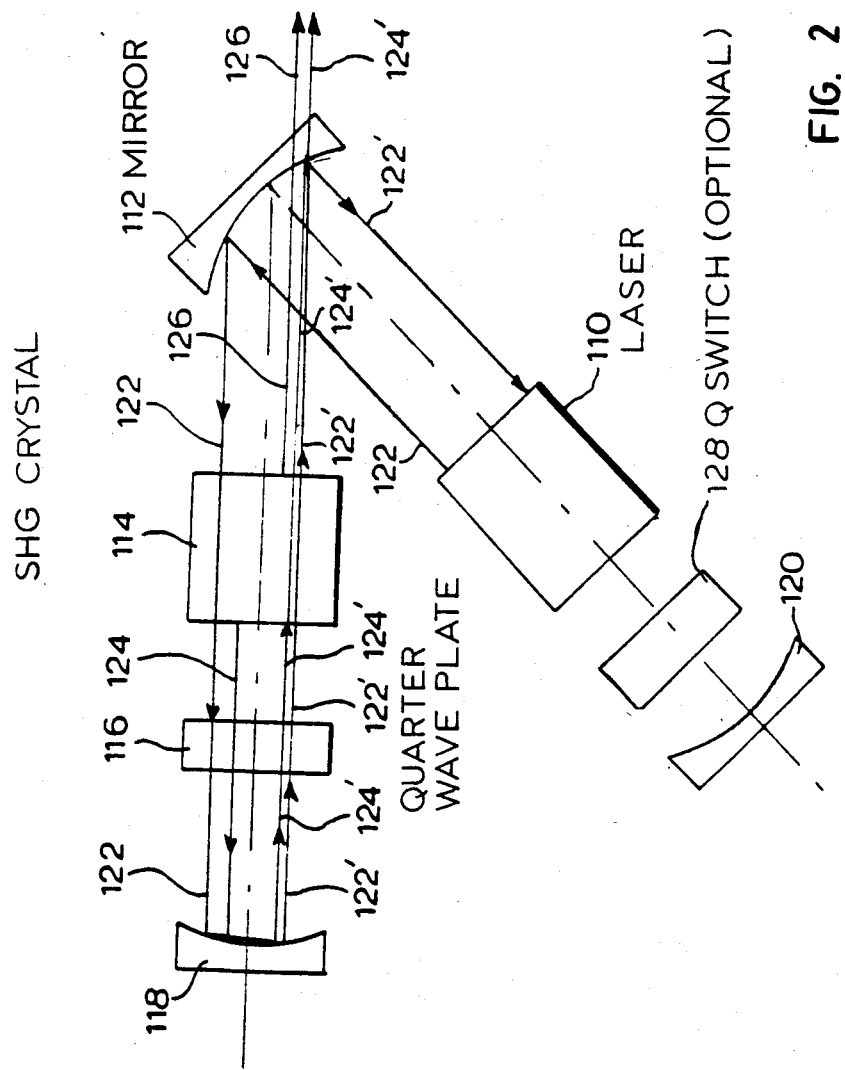
FIG. 2 shows an alternate embodiment of the invention.

Another embodiment of the invention is shown in FIG. 2. In this embodiment, the frequency doubled laser comprises a three-mirror cavity with a mirror 112, an SHG crystal 114, a quarter-wave plate 116, a second mirror 118, a third mirror 120, and a laser active medium 110. The laser 110, the crystal 114, and quarter wave plate 116 function in a manner identical to their counterparts in the embodiment of FIG. 1: Mirror 120 is highly reflective at the fundamental frequency, mirror 112 is highly reflective at the fundamental frequency and highly transmissive at the second harmonic frequency. In addition mirror 112 can also be positioned and arranged to focus the output of laser 110 on crystal 114 for effective second harmonic generation. Mirror 118 is highly reflective at the fundamental frequency and at the second harmonic frequency.

In operation, a fundamental beam having random polarization 122 produced by laser active medium 110 is reflected and focused by mirror 112 on crystal 114. The crystal generates a second harmonic beam 124. After propagation through crystal 114, the O and E rays of fundamental beam 122 are phase shifted with respect to each other as described in the previous embodiment. Also, as in the previous embodiment, the fundamental frequency quarter-wave plate 116 and mirror 118 are used to rotate the O and E rays by 90° after reflection so that passage of beam 122' back through crystal 114 puts all components back in phase and restores the polarization to that polarization which initially left laser active medium 110. On the return trip through crystal 114, beam 122' generates second harmonic beam 126, which is colinear with reflected second harmonic beam 124'.

Thus, in this embodiment, the second harmonic generated on the return trip of the fundamental is not lost so the potential exists for a second harmonic power gain of a factor of two. Interference may occur between these beams which will affect the stability of the SHG output intensity. In order to overcome this undesirable effect, the polarizations of the beams 124' and 126 are made orthogonal using a technique similar to that described in U.S. Pat. No. 4,413,342. Plate 116, is simultaneously made a quarter-wave plate at the second harmonic frequency. Beam 124 will, upon passage through 116, reflection from 118 and return through 116, have its polarization rotated by 90° and thereby be orthogonal and non-interfering with beam 126. Beams 124' and 126 are then coupled out of highly transmissive mirror 112.

Beam 122', after passing through crystal 114 is reflected by mirror 112 toward laser 110. Mirror 120 completes the optical cavity. Plate 116 compensates for the phase shift in the O and E rays of the fundamental beam as previously described thereby insuring that beams 122 and 122' have the same random polarization.

A Q-switch 128 may be added to Q-switch the fundamental beam as described above.

Obviously numerous other modifications may be made to the invention without departing from its scope as defined in the appended claims.

What is claimed is:

1. A frequency doubled laser comprising:
   a first mirror;
   a multimode laser active medium for generating a fundamental beam at a preselected frequency, said beam having a random polarization as a result of said active medium not being naturally birefringent, which polarization can be resolved into two coplanar orthogonal components;
   a crystal with its optic axis parallel to one of said components having an ordinary and an extraordinary axis oriented along said orthogonal rays to generate a second harmonic beam in response to said orthogonal components, said crystal further generating a differential phase delay between said orthogonal rays;
   means for interchanging upon first passage through said means, reflection from the second mirror and return passage through said means the respective orientations of said orthogonal rays to eliminate by return passage through said SHG crystal said differential delay;
   a second mirror, said first mirror and second mirror being arranged to form an optical cavity for said laser active medium, crystal and interchanging means.

2. The frequency doubled laser of claim 1 further comprising a Q-switch for Q-switching the fundamental beam.

3. The frequency doubled laser of claim 1 wherein said interchanging means is a plate positioned for dual passes of the fundamental beam after a pass through the crystal to exchange the ordinary and extraordinary of the fundamental beam before said fundamental beam reenters the crystal.

4. The frequency doubled laser of claim 3 wherein said plate is a quarter wave plate at the fundamental frequency.

5. The frequency doubled laser of claim 1 wherein said second mirror is highly reflective at the fundamental frequency.

6. The frequency doubled laser of claim 5 wherein said second mirror is highly transmissive at the doubled frequency.

7. The frequency doubled laser of claim 1 further comprising a third mirror for reflecting and focusing the fundamental beam from the laser on the crystal.

8. The frequency doubled laser of claim 7 wherein said third mirror is further provided for coupling said second harmonic beam out of said cavity.

9. The frequency doubled laser of claim 8 wherein said interchanging means for the fundamental orthogonal components also interchanges the second harmonic frequency components to preclude interference.

* * * * *